US010073618B2

(12) United States Patent
Abuelsaad et al.

(10) Patent No.: US 10,073,618 B2
(45) Date of Patent: *Sep. 11, 2018

(54) SUPPLEMENTING A VIRTUAL INPUT KEYBOARD

(71) Applicant: International Business Machines Corporation, Armonk, NY (US)

(72) Inventors: Tamer E. Abuelsaad, Poughkeepsie, NY (US); John E. Moore, Brownsburg, IN (US); Rajeshkumar N. Singi, Marietta, GA (US); Robert R. Wentworth, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 345 days.

This patent is subject to a terminal disclaimer.

(21) Appl. No.: 15/079,295

(22) Filed: Mar. 24, 2016

(65) Prior Publication Data

US 2016/0202906 A1    Jul. 14, 2016

Related U.S. Application Data

(63) Continuation of application No. 13/606,223, filed on Sep. 7, 2012, now Pat. No. 9,329,778.

(51) Int. Cl.
*G06F 3/048* (2013.01)
*G06F 3/0488* (2013.01)
(Continued)

(52) U.S. Cl.
CPC ........ *G06F 3/04886* (2013.01); *G06F 3/0233* (2013.01); *G06F 9/454* (2018.02); *G06F 17/243* (2013.01); *G06F 17/289* (2013.01)

(58) Field of Classification Search
None
See application file for complete search history.

(56) References Cited

U.S. PATENT DOCUMENTS 5,276,794 A    1/1994  Lamb, Jr.
5,689,253 A *  11/1997 Hargreaves ................ B41J 5/10
                                                       341/22
(Continued)

FOREIGN PATENT DOCUMENTS

GB    WO2011131989    10/2011

OTHER PUBLICATIONS

Office Action (dated May 21, 2014) for U.S. Appl. No. 13/606,223, filed Sep. 7, 2012, Conf. No. 8581.
(Continued)

*Primary Examiner* — Jennifer To
*Assistant Examiner* — Jasmine Wan
(74) *Attorney, Agent, or Firm* — Schmeiser, Olsen & Watts, LLP; Michael Petrocelli

(57) ABSTRACT

A method and system. A first computer device receives a selection of a form field in a web page from a second computer device that is displaying a virtual keyboard on a display screen in the second computer device. The first and second computer devices are different computer devices. The first computer device determines one or more candidate character keys. The first computer device removes one or more matching character keys from the one or more candidate character keys that match keys in the virtual keyboard. The first computer device determines one or more supplement character keys. The first computer device communicates the one or more supplement character keys to the second computer device. The first computer device causes the second computer device to simultaneously display, on the display screen in the second computer device, the virtual keyboard and the one or more supplement character keys.

18 Claims, 9 Drawing Sheets

(51) Int. Cl.
  *G06F 17/24* (2006.01)
  *G06F 17/28* (2006.01)
  *G06F 3/023* (2006.01)
  *G06F 9/451* (2018.01)

(56) References Cited

U.S. PATENT DOCUMENTS

| | | | |
|---|---|---|---|
| 7,030,863 B2 | 4/2006 | Longe et al. | |
| 7,502,017 B1 | 3/2009 | Ratzlaff et al. | |
| 7,673,249 B2 | 3/2010 | Awada et al. | |
| 8,146,003 B2 | 3/2012 | Gruen et al. | |
| 8,161,395 B2 | 4/2012 | Girgaonkar | |
| 8,182,333 B2 | 5/2012 | Pacey | |
| 2003/0074647 A1* | 4/2003 | Andrew | G06F 9/451 717/100 |
| 2003/0104839 A1* | 6/2003 | Kraft | G06F 3/0237 455/566 |
| 2004/0006455 A1* | 1/2004 | Fux | G06F 17/2715 704/4 |
| 2004/0109028 A1 | 6/2004 | Stern et al. | |
| 2004/0150670 A1* | 8/2004 | Feldman | G06F 3/04883 715/781 |
| 2004/0212595 A1 | 10/2004 | Zhou | |
| 2007/0277118 A1 | 11/2007 | Kotipalli et al. | |
| 2008/0318635 A1 | 12/2008 | Yoon et al. | |
| 2010/0026650 A1* | 2/2010 | Srivastava | G06F 3/0237 345/173 |
| 2010/0090958 A1 | 4/2010 | Perez et al. | |
| 2010/0265183 A1* | 10/2010 | Mail | G06F 3/0238 345/168 |
| 2011/0035664 A1 | 2/2011 | Cho | |
| 2011/0179374 A1 | 7/2011 | Yagi et al. | |
| 2012/0235917 A1 | 9/2012 | Miron | |
| 2012/0326984 A1* | 12/2012 | Ghassabian | G06F 3/0236 345/168 |
| 2013/0174079 A1* | 7/2013 | Morley | G06F 3/0236 715/773 |
| 2014/0075367 A1 | 3/2014 | Abuelsaad et al. | |
| 2014/0108989 A1* | 4/2014 | Bi | G06F 3/04886 715/773 |

OTHER PUBLICATIONS

Amendment (dated Aug. 21, 2014) for U.S. Appl. No. 13/606,223, filed Sep. 7, 2012, Conf. No. 8581.
Final Office Action (dated Oct. 20, 2014) for U.S. Appl. No. 13/606,223, filed Sep. 7, 2012, Conf. No. 8581.
Final Amendment (dated Dec. 18, 2014) for U.S. Appl. No. 13/606,223, filed Sep. 7, 2012, Conf. No. 8581.
RCE (dated Jan. 16, 2015) for U.S. Appl. No. 13/606,223, filed Sep. 7, 2012, Conf. No. 8581.
Office Action (dated May 20, 2015) for U.S. Appl. No. 13/606,223, filed Sep. 7, 2012, Conf. No. 8581.
Amendment (dated Aug. 20, 2015) for U.S. Appl. No. 13/606,223, filed Sep. 7, 2012, Conf. No. 8581.
Final Office Action (dated Nov. 3, 2015) for U.S. Appl. No. 13/606,223, filed Sep. 7, 2012, Conf. No. 8581.
Final Amendment (dated Dec. 31, 2015) for U.S. Appl. No. 13/606,223, filed Sep. 7, 2012, Conf. No. 8581.
Notice of Allowance (dated Feb. 10, 2016) for U.S. Appl. No. 13/606,223, filed Sep. 7, 2012, Conf. No. 8581.

* cited by examiner

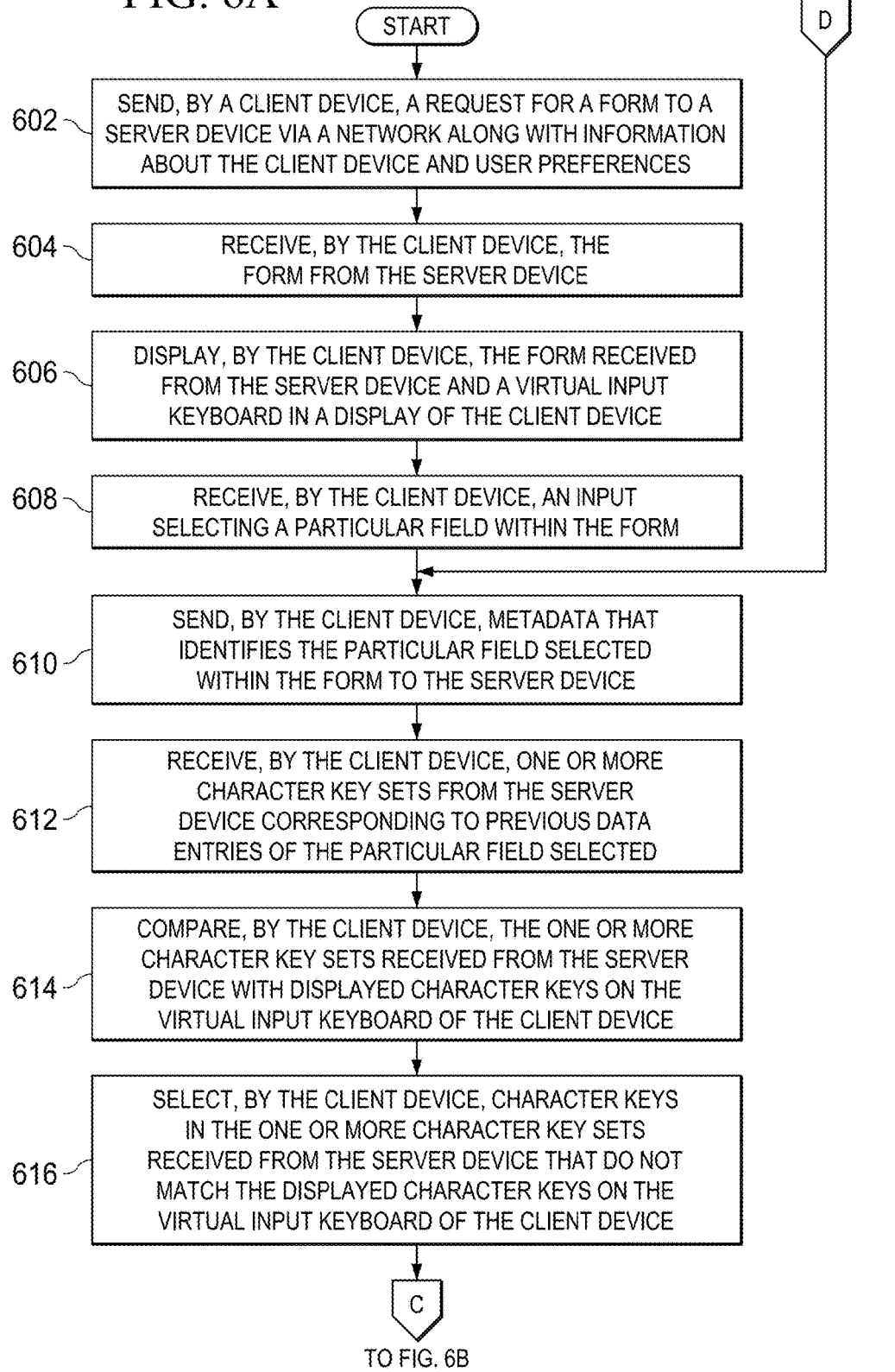

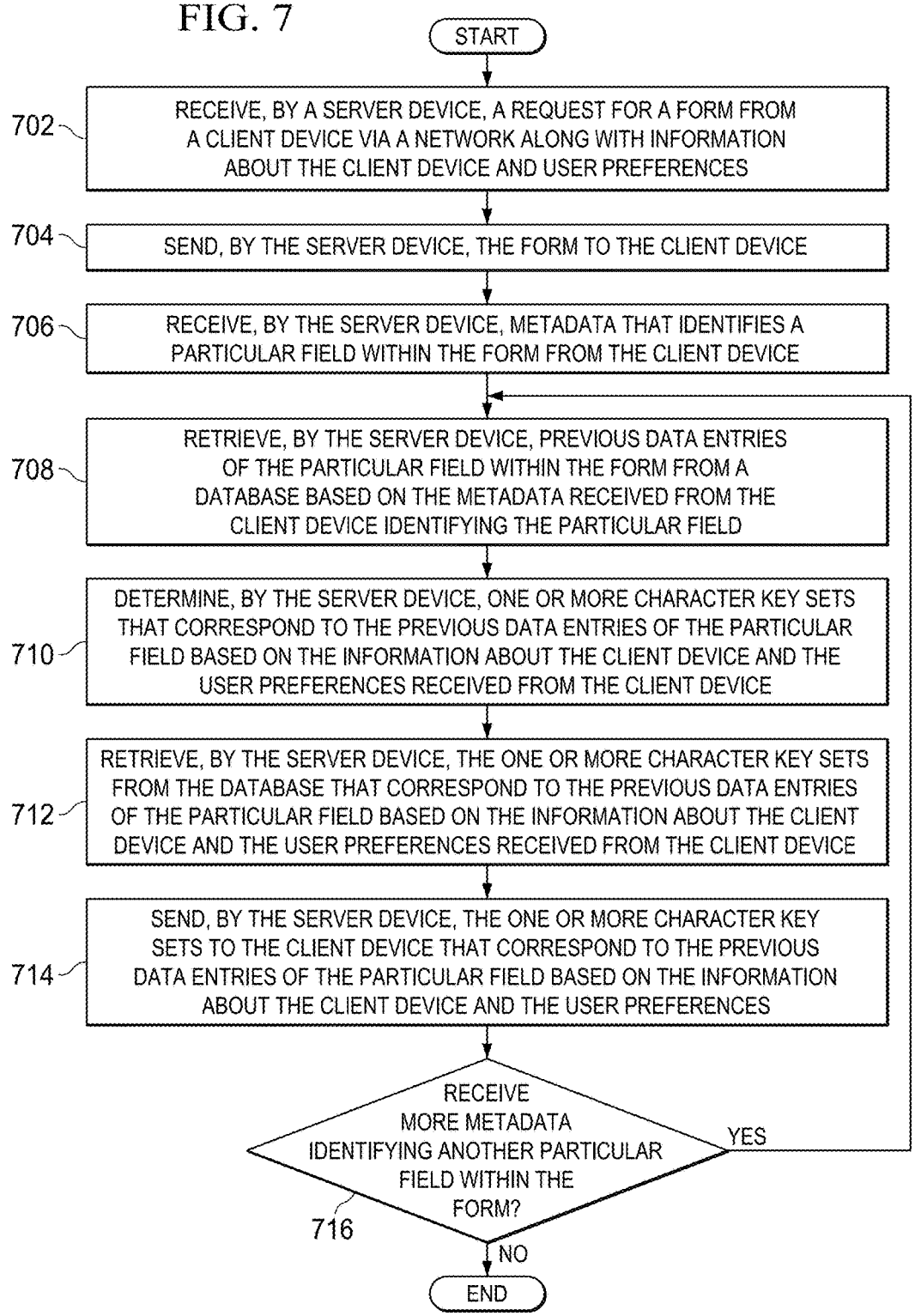

SUPPLEMENTING A VIRTUAL INPUT KEYBOARD

This application is a continuation application claiming priority to Ser. No. 13/606,223, filed Sep. 7, 2012.

BACKGROUND

1. Field of the Invention

The disclosure relates generally to an improved data processing system and more specifically to automatically supplementing a virtual input keyboard displayed on a data processing system with a set of delta character supplemental virtual input keyboards during data entry of a particular data field within a form.

2. Description of the Related Art

Modern mobile computing devices, such as smart telephones and handheld computers, present different types and sizes of virtual input keyboards to users for data entry. For example, a mobile computing device may display a full alphabetic virtual keyboard for a user to input data, but to input numbers the user must switch to a different virtual keyboard that includes numeric keys and to input punctuation the user must switch to yet another different virtual keyboard that includes punctuation keys. With the current use of complex passwords, which include a combination of several different types of character keys, such as upper case and lower case alphabetic characters, number characters, and special characters, to prevent unauthorized access, the constant switching between the different types of virtual input keyboards becomes work intensive. This is especially true when a user is filling out a lengthy and complex form using a mobile computing device with limited display real estate.

SUMMARY

According to one embodiment of the present invention, a computer implemented method for supplementing a virtual input keyboard is provided. A computer device displays a form and a virtual input keyboard in a display of the computer device. The computer device receives an input selecting a particular field within the form. The computer device retrieves one or more character key sets corresponding to previous data entries of the particular field selected. The computer device determines a delta set of character keys based on character keys in the one or more character key sets that do not match displayed character keys on the virtual input keyboard. The computer device generates a set of delta character supplemental virtual input keyboards based on the delta set of character keys. Then, the computer device displays the set of delta character supplemental virtual input keyboards in the display.

In another embodiment of the present invention, a data processing system for supplementing a virtual input keyboard is provided. The data processing system includes a bus system, a storage device connected to the bus system that stores computer readable program code, and a processor connected to the bus system that executes the computer readable program code. The processor executes the computer readable program code to display a form and a virtual input keyboard in a display of the data processing system; receive an input selecting a particular field within the form; retrieve one or more character key sets corresponding to previous data entries of the particular field selected; determine a delta set of character keys based on character keys in the one or more character key sets that do not match displayed character keys on the virtual input keyboard; generate a set of delta character supplemental virtual input keyboards based on the delta set of character keys; and display the set of delta character supplemental virtual input keyboards in the display.

In yet another embodiment of the present invention, a computer program product stored on a computer readable storage device having computer readable program code embodied thereon that is executable by a data processing system for supplementing a virtual input keyboard is provided. The computer program product includes computer readable program code for displaying a form and a virtual input keyboard in a display of the data processing system; computer readable program code for receiving an input selecting a particular field within the form; computer readable program code for retrieving one or more character key sets corresponding to previous data entries of the particular field selected; computer readable program code for determining a delta set of character keys based on character keys in the one or more character key sets that do not match displayed character keys on the virtual input keyboard; computer readable program code for generating a set of delta character supplemental virtual input keyboards based on the delta set of character keys; and computer readable program code for displaying the set of delta character supplemental virtual input keyboards in the display.

BRIEF DESCRIPTION OF THE SEVERAL VIEWS OF THE DRAWINGS

FIG. 6A and FIG. 6B are a flowchart illustrating a process of a client device in accordance with an illustrative embodiment.

FIG. 7 is a flowchart illustrating a process of a server device in accordance with an illustrative embodiment.

DETAILED DESCRIPTION

Figure 1:
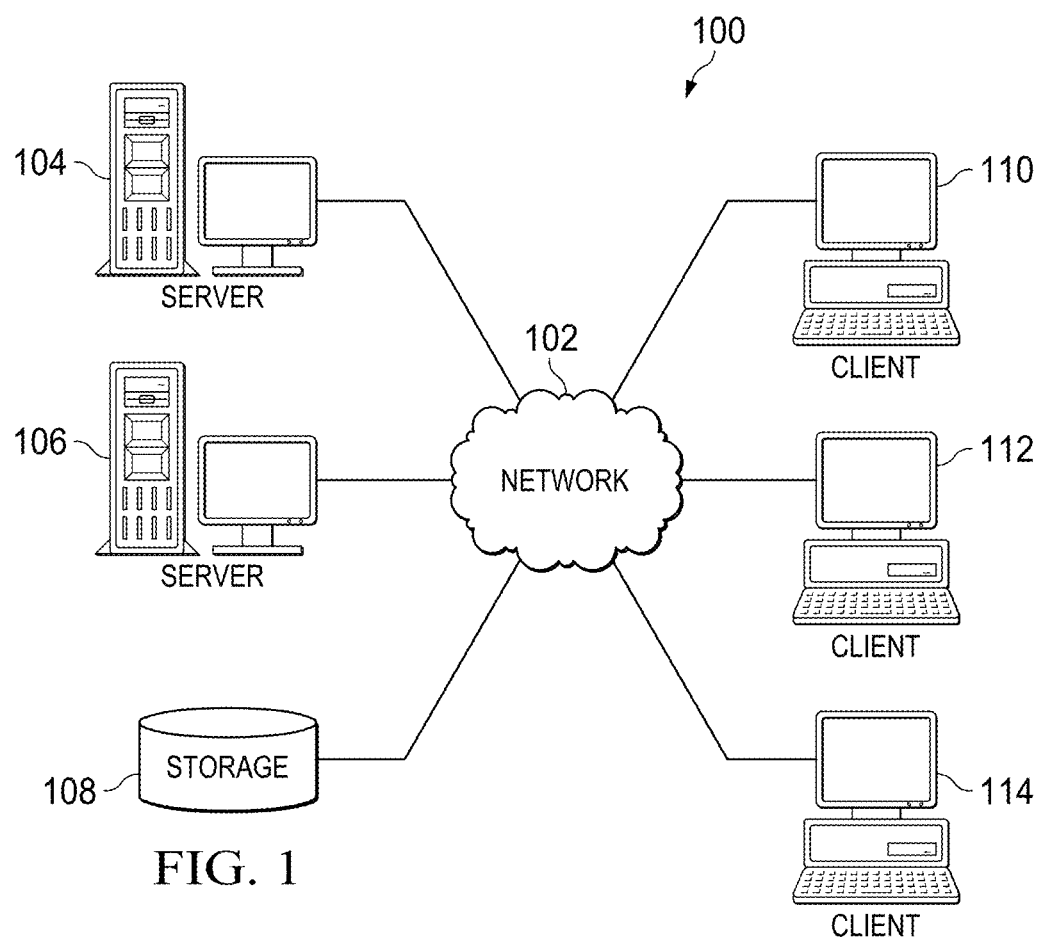
FIG. 1 is a pictorial representation of a network of data processing systems in which illustrative embodiments may be implemented.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
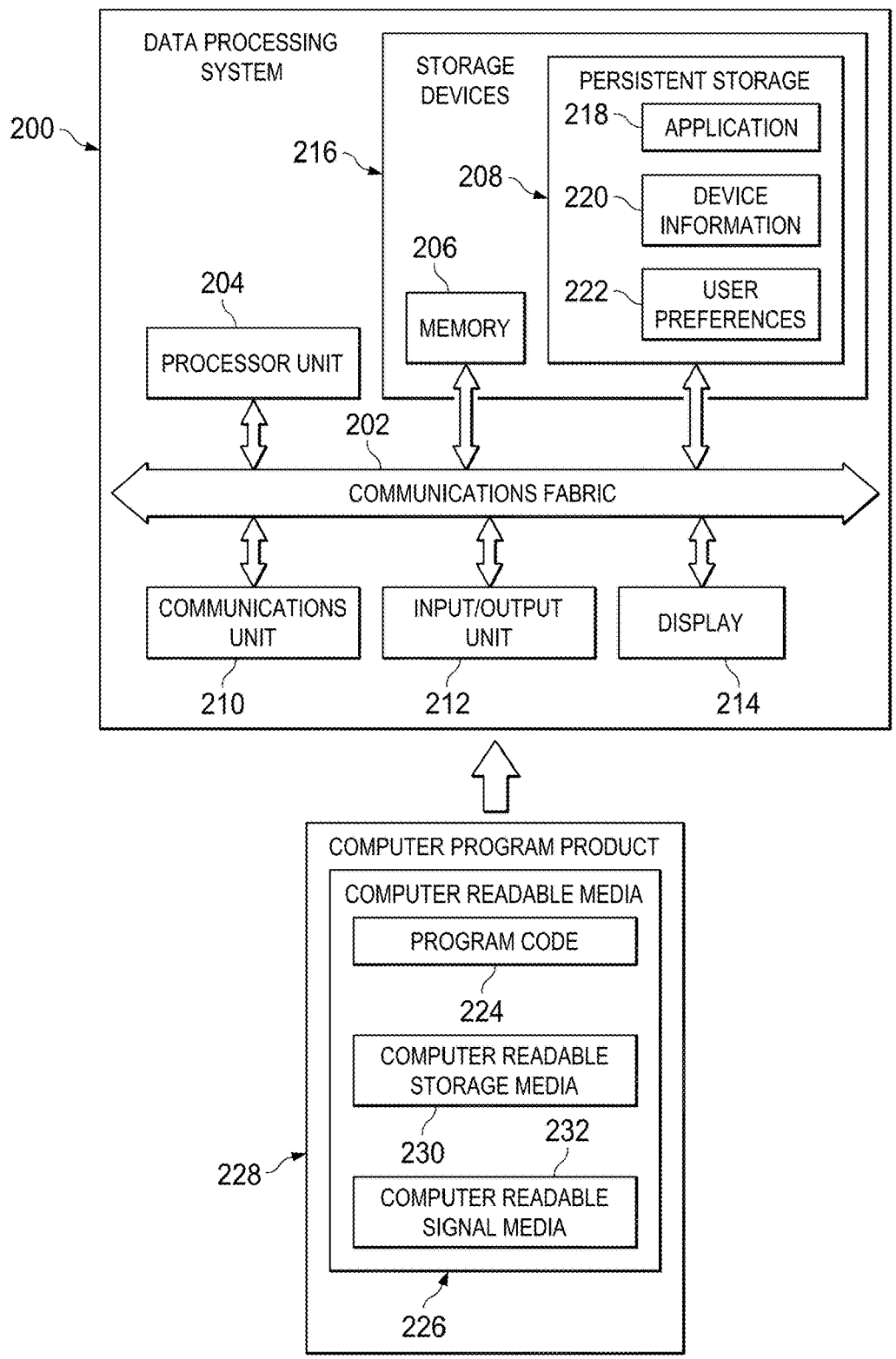
FIG. 2 is a diagram of a data processing system in which illustrative embodiments may be implemented.
Figure 3:
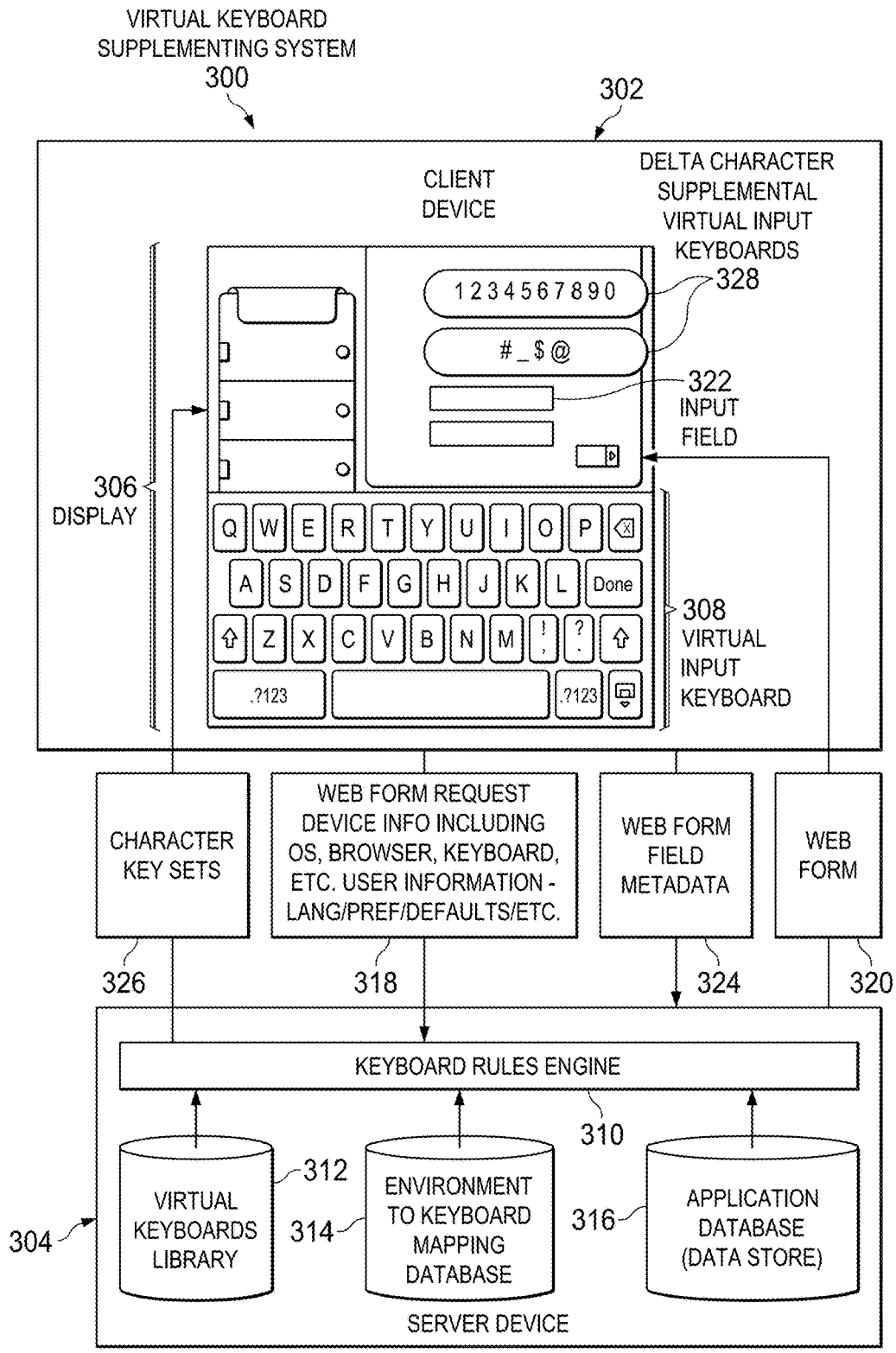
FIG. 3 is a diagram illustrating an example of a virtual keyboard supplementing system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other various devices connected together within network data processing system 100. Network 102 may include connections, such as wire, wireless communication links, or fiber optic cables.

In the depicted example, server 104 and server 106 connect to network 102, along with storage 108. Server 104 and server 106 may be, for example, server devices with high speed connections to network 102 that provide web sites and other services for business entities, government agencies, educational institutions, healthcare institutions, social media companies, non-profit organizations, and the like.

Storage 108 is a network storage device capable of storing data in a structured or unstructured format. Storage 108 may store data, such as, for example, previous data entries made by users within forms provided by web sites serviced by server 104 and/or server 106. In addition, storage 108 may store character key sets corresponding to the previous data entries within the forms. A character key set is a class of character keys that includes all character keys that are associated with a particular class of characters. For example, all of the numeric characters 0-9 may make up one character key set, while all of the alphabetic characters a-z may make up another character key set. Of course it should be noted that illustrative embodiments may utilize many different types of character key sets. Further, storage 108 may store other data, such as, for example, personal profiles and/or personal preferences of a plurality of users and security access information, such as user names and passwords associated with the plurality of users.

Clients 110, 112, and 114 also connect to network 102. Clients 110, 112, and 114 are clients of server 104 and/or server 106. In the depicted example, server 104 and server 106 may provide information, such as boot files, operating system images, and applications to clients 110, 112, and 114. In addition, clients 110, 112, and 114 may access services and web sites provided by server 104 and/or server 106. Furthermore, network data processing system 100 may include additional server devices, client devices, and other devices not shown in this illustrative example.

Program code located in network data processing system 100 may be stored on a computer readable storage device and downloaded to a computer or data processing system for use. For example, program code may be stored on a computer readable storage device on server 104 and downloaded to client 110 over network 102 for use on client 110.

In the depicted example, network data processing system 100 may be implemented as a number of different types of networks, such as for example, an internet, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer in which computer readable program code or instructions implementing processes of illustrative embodiments may be located. Data processing system 200 may be, for example, a client device or a server device, such as client 110 or server 104 in FIG. 1. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, computer readable program code in functional form, and/or other suitable information either on a transient basis and/or a persistent basis. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores application 218, device information 220, and user preferences 222. Data processing system 200 utilizes application 218 to control the process of automatically supplementing a virtual input keyboard displayed on display 214 with a set of one or more delta character supplemental virtual input keyboards during entry of data within a particular input field of a form. The form may be, for example, a web form or any other type of editable data entry form. A form is a data entry representation or collection of data entry fields. Application 218 may be, for example, a web browser, an email application, or any other type of application or program that is capable of inputting data into a form. In addition, application 218 may include a virtual input keyboard that is associated with application 218. For example, application 218 may be a banking application that includes a virtual banking input keyboard that includes character keys specific to the banking industry. Application 218 also may include a keyboard rules engine that provides rules for supplementing the virtual input keyboard. The keyboard rules engine may be a plug-in component on application 218. Alternatively, the keyboard rules engine may be a part of the operating system of data processing system 200.

Device information 220 is data associated with data processing system 200. For example, device information 220 may include data such as the type of device data processing system 200 is, the operating system loaded on data processing system 200, the type of web browser used by data processing system 200, display parameters of display 214, virtual input keyboard layout of data processing system 200, geographic location of data processing system 200, and any other pertinent information regarding data processing system 200. Application 218 may use, for example, a software agent to collect this data in order to generate device information 220. A GPS component may, for example, provide the geographic location data. Alternatively, device information 220 may be provided by a user of data processing system 200.

User preferences 222 are stored preferences entered by a user of data processing system 200. User preferences 222 may include, for example, the preferred language of a user, a preferred set of character key sets, and the like. Of course, user preferences 222 may include any type of preference associated with the user.

Communications unit 210, in this example, provides for communication with other data processing systems connected to a network, such as network 102 in FIG. 1. In this example, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a set of one or more virtual input keyboards and/or some other suitable input device. Further, input/output unit 212 may send output to a printer. Display 214 provides a mechanism to display information to a user. In addition, display 214 includes touch screen capabilities to receive user inputs.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These instructions are referred to as program code, computer usable program code, or computer readable program code that may be read and run by processor unit 204. The program code, in the different embodiments, may be embodied on different physical or computer readable storage media, such as memory 206 or persistent storage 208.

Program code 224 is located in a functional form on computer readable media 226 that is selectively removable and may be loaded onto or transferred to data processing system 200 for running by processor unit 204. Program code 224 and computer readable media 226 form computer program product 228. In one example, computer readable media 226 may be computer readable storage media 230 or computer readable signal media 232. Computer readable storage media 230 may include, for example, an optical or magnetic disc that is inserted or placed into a drive or other device that is part of persistent storage 208 for transfer onto a storage device, such as a hard drive, that is part of persistent storage 208. Computer readable storage media 230 also may take the form of a persistent storage, such as a hard drive, a thumb drive, or a flash memory that is connected to data processing system 200. In some instances, computer readable storage media 230 may not be removable from data processing system 200.

Alternatively, program code 224 may be transferred to data processing system 200 using computer readable signal media 232. Computer readable signal media 232 may be, for example, a propagated data signal containing program code 224. For example, computer readable signal media 232 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 224 may be downloaded over a network to persistent storage 208 from another device or data processing system through computer readable signal media 232 for use within data processing system 200. For instance, program code stored in a computer readable storage media in a server data processing system may be downloaded over a network from the server to data processing system 200. The data processing system providing program code 224 may be a server computer, a client computer, or some other device capable of storing and transmitting program code 224.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 226 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

During the course of developing illustrative embodiments, it was discovered that entering data on data processing systems, such as smart phones and handheld computer devices with limited display real estate, requires virtual input keyboard layouts to be frequently changed by user intervention. Some data processing systems will switch to numeric keys when numbers are needed and back to alphabetic keys when not. However, this type of switching does not scale well for data input fields that require alphanumeric inputs and special character inputs. Illustrative embodiments do not simply memorize last recently used data input values and then present these memorized values for an auto completion like experience.

A user may utilize illustrative embodiments to complete forms that require user input. Illustrative embodiments may utilize a software agent to interrogate the data processing system to determine the data processing system's type, operating system, web browser, and standard virtual input keyboard layout. If illustrative embodiments determine that the currently displayed virtual input keyboard layout is insufficient for the type of data to be inputted within a particular input field of a form, illustrative embodiments will automatically display a set of one or more additional or supplemental virtual input keyboards that include the missing character key sets. For example, if a user wants to complete a form that requires name, address, phone number, and email address using a current data processing system, the user must switch the virtual input keyboard repeatedly to get to number keys and to special character keys. In contrast, illustrative embodiments determine which character keys are presently displayed on the virtual input keyboard on the data processing system and then automatically display missing character keys on one or more supplemental virtual input keyboards on the display screen. Consequently, when the user enters an address in the address field of the form, illustrative embodiments automatically display an additional virtual number keyboard for the street number and zip code, while continuing to display the virtual alphabetic keyboard. Also, illustrative embodiments will only display the virtual alphabetic keyboard for the user name field, the city name field, and the state name field. Then, illustrative embodiments will once again display the additional virtual number keyboard, along with the alphabetic keyboard, for entry of numbers within the phone number field. Furthermore, illustrative embodiments may display a second additional virtual input keyboard that includes special character keys, along with the virtual number keyboard and the alphabetic keyboard, for the inputting of the email address within the email address field of the form. As a further example, illustrative embodiments may provide accent character keys associated with other languages in yet another additional or supplemental virtual input keyboard.

As a result, illustrative embodiments provide an ability to display one or more supplemental virtual input keyboards based on the data input needs of each particular field within the form, in addition to the default virtual input keyboard already displayed on the data processing system. Consequently, illustrative embodiments eliminate user switching between virtual input keyboard sets on the data processing system. Moreover, to prevent exposing specific character keys used by other users in completing the same form, illustrative embodiments display not only the character keys used by the other users, but an entire class of character keys as well. For example, if only the numbers 4 and 6 were used in all previous inputs of a particular data field by the other users, illustrative embodiments will offer the entire character key set of the numbers 0-9. Similarly, if only the letters a and f were previously input within a particular data input field, then illustrative embodiments will offer the entire character key set of the letters a-z. Further, if only the special characters # and & were previously input within a particular input field, then illustrative embodiments will offer an entire character key set of special characters, such as @, #, $, %, ^, &, *, §, £, and ¶. In other words, character key sets are classes of character keys associated with the previous data entries made by one or more users. Illustrative embodiments determine a character key set by mapping all previously used characters from stored historical input data of a particular data input field to a character key set that maintains privacy of the previous inputs by the users.

Subsequently, illustrative embodiments subtract character keys that are already available on data processing system's virtual input keyboard from the character key sets offered. The difference between the already displayed character keys and an offered supplemental character key set is referred to as a delta set of character keys. Illustrative embodiments then generate a set of one or more delta character supplemental virtual input keyboards that are capable of taking spatial input from the touch screen display based on the delta set of character keys. The data processing system receives the touch screen inputs of the displayed character keys to fill in a particular data input field within the form. This process is repeated for each particular data input field within the form. Also it should be noted that once a particular data input field is completed, illustrative embodiments remove the one or more delta character supplemental virtual input keyboards associated with that particular data input field from the display.

Moreover, a user's language preference may also influence delta character key selections. For example, a data input field of a web form that is used by a diverse user base may have data inputs made in many different languages. If the current user is English speaking, with US English set as the preferred language of the current geographic location of the mobile data processing system, then it is not beneficial for illustrative embodiments to display a Russian character key set of a class of characters to the current user even though the Russian character key set was used by other users to enter data within the same data input field of the web form. Hence, illustrative embodiments seek to only present the minimum number of additional character key sets needed for a better user experience and thereby decrease added screen clutter. Thus, illustrative embodiments provide a computer implemented method, a data processing system, and a computer program product for automatically supplementing a virtual input keyboard displayed on a data processing system with a set of delta character supplemental virtual input keyboards during data entry of a particular field within a form.

With reference now to FIG. 3, a diagram illustrating an example of a virtual keyboard supplementing system is depicted in accordance with an illustrative embodiment. Virtual keyboard supplementing system 300 is a system of hardware and software components used for automatically supplementing a virtual input keyboard displayed on a data processing system with a set of delta character supplemental virtual input keyboards during data entry within a particular field of a form. Virtual keyboard supplementing system 300 may be implemented, for example, in a network data processing system, such as network data processing system 100 in FIG. 1.

Virtual keyboard supplementing system 300 includes client device 302 and server device 304. Client device 302 may be, for example, client 110 in FIG. 1. Client device 302 may be, for example, a smart phone or a handheld computer. Client device 302 includes display 306, such as display 214 in FIG. 2. Display 306 has touch screen capabilities and includes virtual input keyboard 308. In this example, virtual input keyboard 308 includes alphabetic character keys and punctuation character keys.

Server device 304 may be, for example, server 104 in FIG. 1. Server device 304 and client device 302 are connected via a network, such as network 102 in FIG. 1. In this example, server device 304 includes keyboard rules engine 310, virtual keyboards library 312, environment to keyboard mapping database 314, and application database 316. However, even though keyboard rules engine 310, virtual keyboards library 312, environment to keyboard mapping database 314, and application database 316 are shown to be located on server device 304, it should be noted that one or more of these components may be located on client device 302 in addition to or instead of on server device 304.

Keyboard rules engine 310 controls the process of automatically supplementing virtual input keyboard 308 displayed on display 306 with a set of one or more delta character supplemental virtual input keyboards, such as delta character supplemental virtual input keyboards 328, during entry of data within a particular data input field of a form, such as input field 322 of web form 320. Keyboard rules engine 310 provides the rules used for supplementing virtual input keyboard 308. Keyboard rules engine 310 may be a plug-in software component or may be a part of the operating system.

Virtual keyboard library 312 is a library of all possible character keys sets that may be used to supplement virtual input keyboard 308. Environment to keyboard mapping database 314 provides the mapping information necessary to map the character key sets within virtual keyboard library 312 to the previously stored data entries of each data input field within each of a plurality of forms stored within application database 316.

Client device 302 sends web form request 318, along with device information and user preferences, to server 304. The device information is data associated with client device 302 and may include information such as what type of device client device 302 is, the operating system on client device 302, the type of web browser on client device 302, display parameters of display 306, layout of virtual input keyboard 308, and geographic location of client device 302. The user preferences are preferences of a user of client device 302 and may include, for example, the preferred language of the user.

Upon receiving web form request 318, server device 304 sends web form 320 to client device 302. Also, it should be noted that that server device 304 may send virtual input keyboard 308 to client device 302 when server device 304 sends web form 320 to client device 302. In other words in the scenario where server device 304 sends virtual input keyboard 308 to client device 302, virtual input keyboard 308 is associated with web form 320. Client device 302 displays web form 320 in display 306, along with virtual input keyboard 308. After web form 320 is displayed on display 306, a user of client device 302 selects a particular data input field within web form 320, such as input field 322, to enter data. Upon selection of input field 322, client device 302 sends web form field metadata 324 to server device 304. Web form field metadata 324 specifically identifies input field 322.

Server device 304 uses web form field metadata 324 to retrieve previously stored data entries of input field 322 made by other users utilizing other client devices from application database 316. Based on the retrieved data entries from application database 316, server device 304 selects a set of one or more character key sets, such as character key sets 326, from virtual keyboard library 312. Character key sets 326 are classes of character keys associated with the previous data entries made by one or more users. Then, server 304 sends character key sets 326 to client device 302.

Upon receiving character key sets 326, client device 302 compares character key sets 326 with character keys already present on virtual input keyboard 308. Afterward, client device 302 deletes matching character keys from character key sets 326 that match the character keys already present on virtual input keyboard 308. Then, client device 302 determines a delta set of character keys based on remaining character keys in character key sets 326 after deleting the matching character keys. Alternatively, server device 304 may perform the calculations necessary to determine the delta set of character keys and then sends the delta set of character keys to client device 302.

Further, client device 302 generates delta character supplemental virtual input keyboards 328 based on the delta set of character keys. Then, client device 302 displays delta character supplemental virtual input keyboards 328 in display 306 adjacent to input field 322. In this illustrated example, delta character supplemental virtual input keyboards 328 include a numeric character keyboard and a special character keyboard. However, it should be noted that illustrative embodiments may include more or fewer virtual keyboards within delta character supplemental virtual input keyboards 328. Further, client device 302 may receive data inputs from delta character supplemental virtual input keyboards 328 in addition to virtual input keyboard 308. Furthermore, after the user selects another input field within web form 320, client device 302 removes delta character supplemental virtual input keyboards 328 from display 306 and starts the process over again.

However it should be noted that in an alternative illustrative embodiment, client device 302 may receive all character key sets corresponding to all input fields within web form 320 from server device 304 at a same time instead of receiving character key sets after each selection of a particular data input field. Server device 304 sends all of the character key sets to client device 302 at the same time to decrease network traffic and to increase performance of client device 302. Further, client device 302 and/or server device 304 may pre-calculate all delta sets of character keys per data input field and then cache the pre-calculated delta sets of character keys for faster performance. In other words, client device 302 and/or server device 304 calculate all delta sets of character keys per data input field ahead of time, associate each of the delta sets of character keys with metadata corresponding to a respective data input field, and then store this information on client device 302 and/or server device 304. Using this technique, illustrative embodiments may just fetch the pre-calculated delta sets of character keys or character classes from a cache when a user selects a particular data input field within a form.

Figure 4:
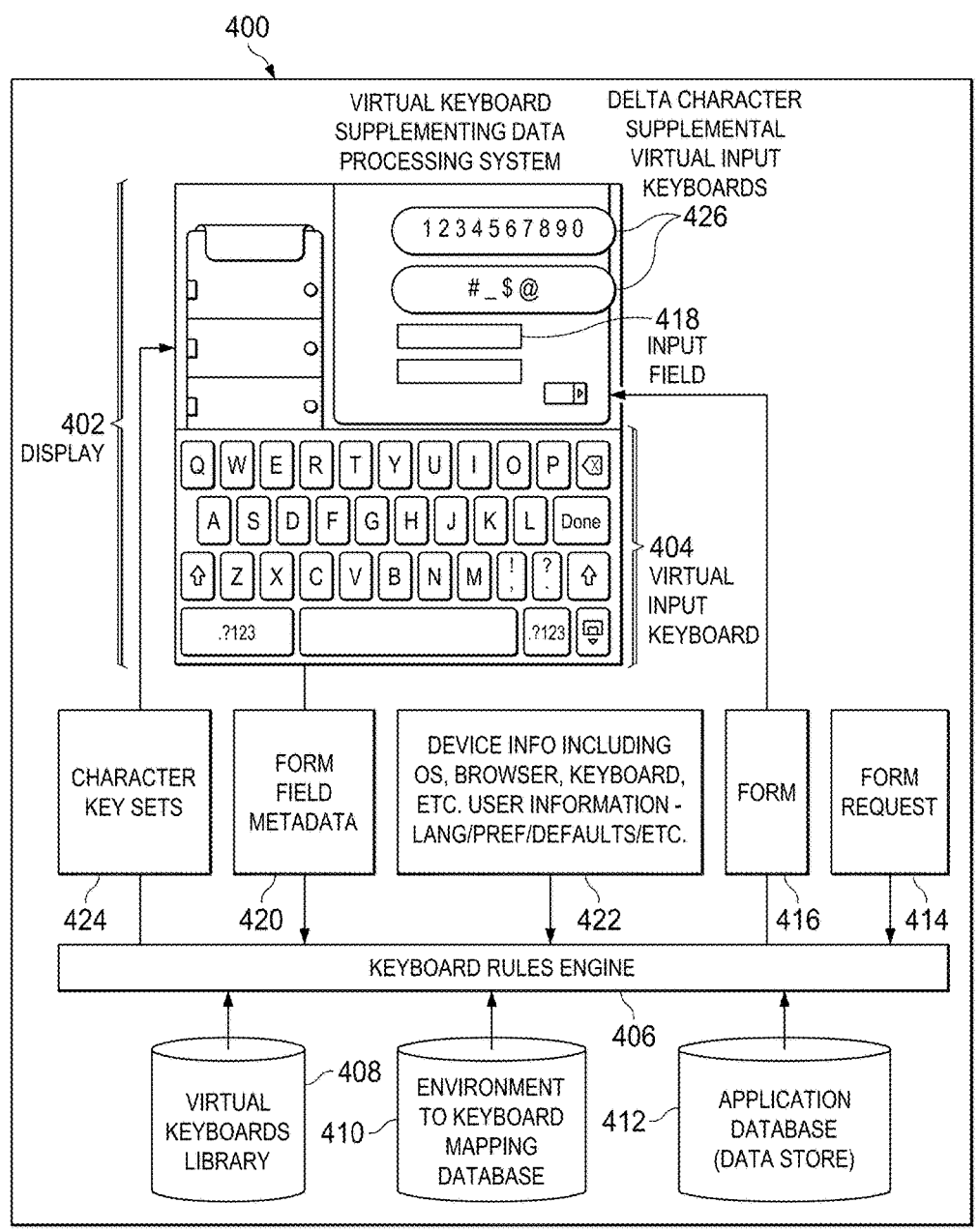
FIG. 4 is a diagram illustrating an example of a virtual keyboard supplementing data processing system in accordance with an illustrative embodiment.

With reference now to FIG. 4, a diagram illustrating an example of a virtual keyboard supplementing data processing system is depicted in accordance with an illustrative embodiment. Virtual keyboard supplementing data processing system 400 is an example of a data processing system, such as a smart phone or a handheld computer, that includes hardware and software components used for automatically supplementing a virtual input keyboard displayed on the data processing system with a set of delta character supplemental virtual input keyboards during data entry within a particular field of a form. Virtual keyboard supplementing data processing system 400 may be implemented, for example, in a data processing system, such as data processing system 200 in FIG. 2.

Virtual keyboard supplementing data processing system 400 includes display 402. Display 402 is a mechanism to display information to a user and may be, for example, display 214 in FIG. 2. Display 402 has touch screen capabilities and includes virtual input keyboard 404. Virtual input keyboard 404 is a means to receive user input. In this example, virtual input keyboard 404 includes alphabetic character keys and punctuation character keys.

Also in this example, virtual keyboard supplementing data processing system 400 includes keyboard rules engine 406, virtual keyboards library 408, environment to keyboard mapping database 410, and application database 412. Keyboard rules engine 406 controls the process of automatically supplementing virtual input keyboard 404 displayed on display 402 with a set of one or more delta character supplemental virtual input keyboards, such as delta character supplemental virtual input keyboards 426, during entry of data within a particular data input field of a form, such as input field 418 of form 416. Keyboard rules engine 406 provides the rules used for supplementing virtual input keyboard 404. Keyboard rules engine 406 may be a plug-in software component of an application, such as application 218 in FIG. 2, or may be a part of the operating system of virtual keyboard supplementing data processing system 400.

Virtual keyboard library 408 is a library of all possible character keys sets that may be used to supplement virtual input keyboard 404. Environment to keyboard mapping database 410 provides the mapping information necessary to map the character key sets within virtual keyboard library 408 to the previously stored data entries of each data input field. Application database 412 is an example of a data store that stores previously entered data within each of the data input fields of one or more data entry forms.

Virtual keyboard supplementing data processing system 400 receives form request 414. Form request 414 is a request to display an editable data entry form within display 402. After receiving form request 414, virtual keyboard supplementing data processing system 400 displays form 416 in display 402, along with virtual input keyboard 404. After form 416 is displayed on display 402, a user of virtual keyboard supplementing data processing system 400 selects a particular data input field within form 416, such as input field 418, to enter data. Upon selection of input field 418, virtual keyboard supplementing data processing system 400 retrieves form field metadata 420. Form field metadata 420 specifically identifies input field 418.

Virtual keyboard supplementing data processing system 400 uses form field metadata 420 to retrieve previously stored data entries of input field 418 made by one or more users from application database 412. In addition, virtual keyboard supplementing data processing system 400 retrieves information 422 from a database. Information 422 may include device information and user preferences. The device information is data associated with virtual keyboard supplementing data processing system 400 and may include information such as what type of device virtual keyboard supplementing data processing system 400 is, the operating system on virtual keyboard supplementing data processing system 400, display parameters of display 402, layout of virtual input keyboard 404, and geographic location of virtual keyboard supplementing data processing system 400. The user preferences are preferences of a user of virtual keyboard supplementing data processing system 400 and may include, for example, the preferred language of the user.

Based on the retrieved data entries from application database 412, virtual keyboard supplementing data processing system 400 selects a set of one or more character key sets, such as character key sets 424, from virtual keyboard library 408. Character key sets 424 are classes of character keys associated with the previous data entries made by one or more users. Then, server 304 sends character key sets 326 to client device 302.

Virtual keyboard supplementing data processing system 400 compares character key sets 424 with character keys already present on virtual input keyboard 404. Afterward, virtual keyboard supplementing data processing system 400 deletes matching character keys from character key sets 424 that match the character keys already present on virtual input keyboard 404. Then, virtual keyboard supplementing data processing system 400 determines a delta set of character keys based on remaining character keys in character key sets 424 after deleting the matching character keys.

Further, virtual keyboard supplementing data processing system 400 generates delta character supplemental virtual input keyboards 426 based on the delta set of character keys. Then, virtual keyboard supplementing data processing system 400 displays delta character supplemental virtual input keyboards 426 in display 402 adjacent to input field 418. Further, virtual keyboard supplementing data processing system 400 may receive data inputs from delta character supplemental virtual input keyboards 426 in addition to or instead of virtual input keyboard 404. Furthermore, after the user selects another input field within form 416, virtual keyboard supplementing data processing system 400 removes delta character supplemental virtual input keyboards 426 from display 402 and starts the process over again. However it should be noted that in an alternative illustrative embodiment, virtual keyboard supplementing data processing system 400 may retrieve all character key sets corresponding to all input fields within form 416 at a same time instead of receiving character key sets after each selection of a particular data input field.

Figure 5A:
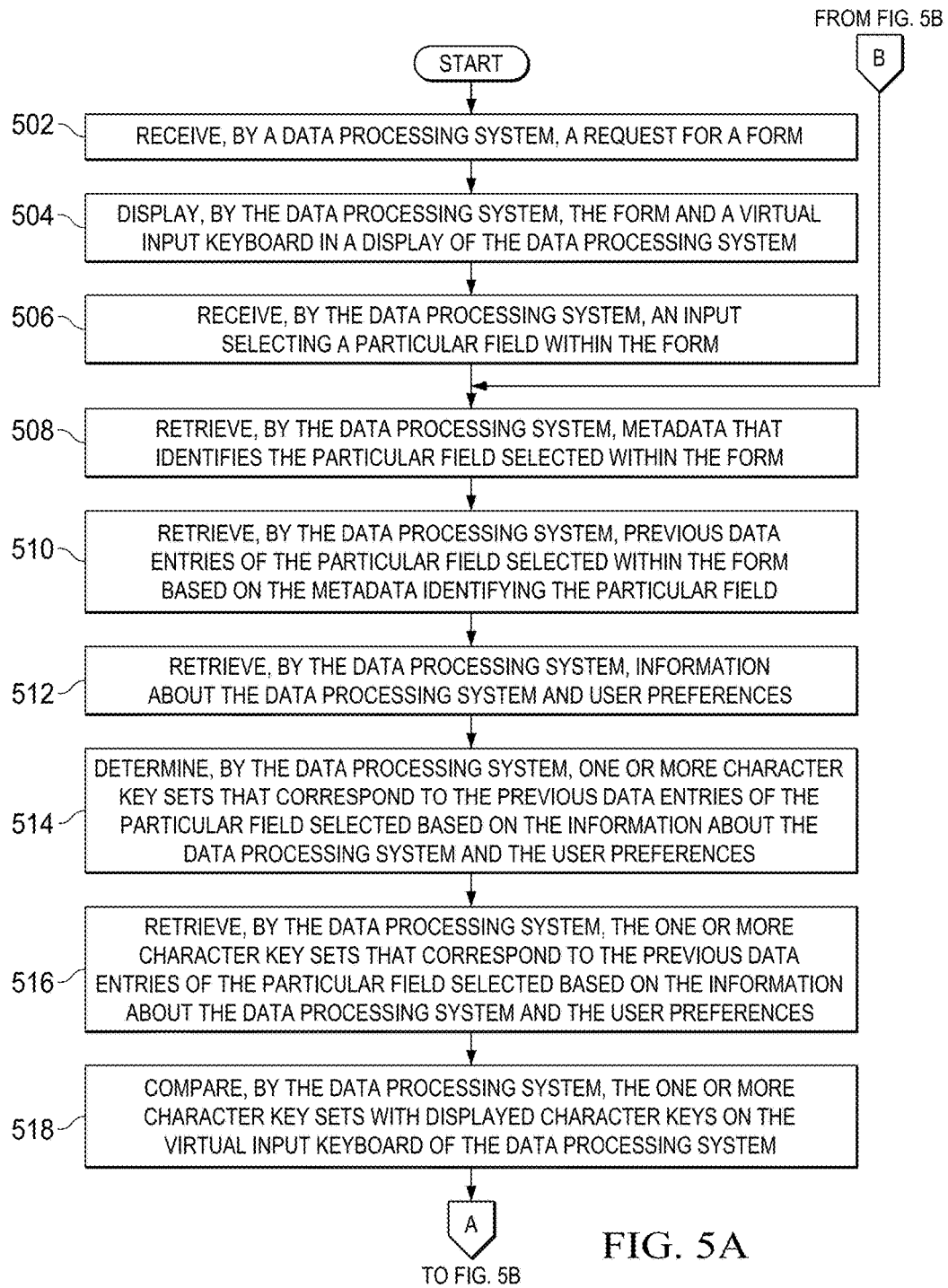
FIG. 5A and FIG. 5B are a flowchart illustrating a process of a data processing system in accordance with an illustrative embodiment.
Figure 5B:
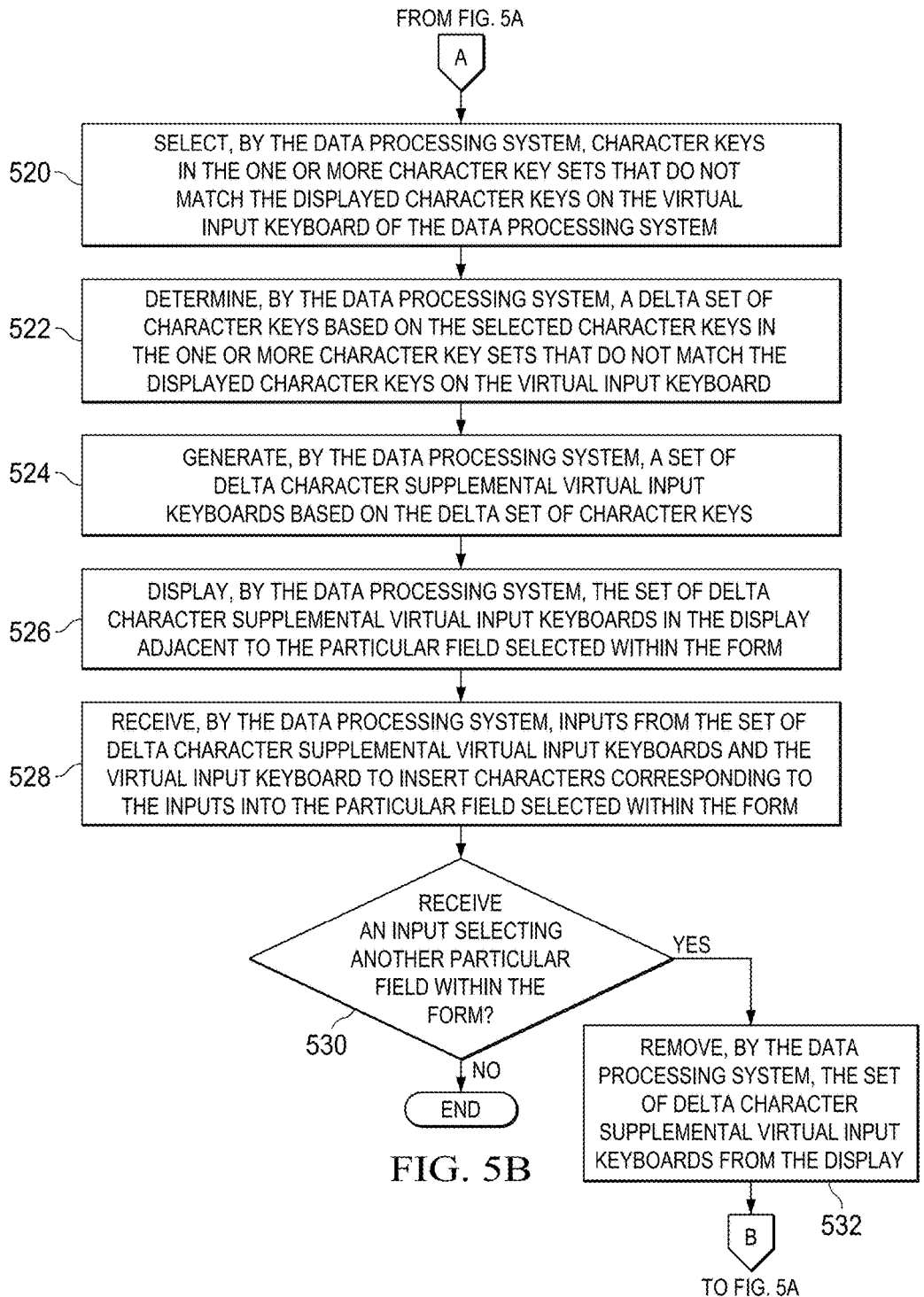

With reference now to FIG. 5A and FIG. 5B, a flowchart illustrating a process of a data processing system is shown in accordance with an illustrative embodiment. The process shown in FIGS. 5A and 5B may be implemented in a data processing system, such as, for example, data processing system 200 in FIG. 2 and performed by a virtual keyboard supplementing data processing system, such as virtual keyboard supplementing data processing system 400 in FIG. 4.

The process begins when the data processing system receives a request for a form (step 502). The form may be, for example, an editable data entry form, such as form 416 in FIG. 4. Subsequently, the data processing system displays the form and a virtual input keyboard in a display, such as display 402 in FIG. 4, of the data processing system (step 504). Afterward, the data processing system receives an input selecting a particular field within the form (step 506).

Subsequent to receiving the input selecting a particular field within the form in step 506, the data processing system retrieves metadata that identifies the particular field selected within the form (step 508). Then, the data processing system retrieves previous data entries of the particular field selected within the form based on the metadata identifying the particular field (step 510). In addition, the data processing system retrieves information about the data processing system and user preferences (step 512).

Afterward, the data processing system determines one or more character key sets that correspond to the previous data entries of the particular field selected based on the information about the data processing system and the user preferences (step 514). Subsequently, the data processing system retrieves the one or more character key sets that correspond to the previous data entries of the particular field selected based on the information about the data processing system and the user preferences (step 516). Each of the one or more character key sets represents a class of character keys. A class of character keys includes all character keys that are associated with a particular class of characters. A particular class of characters is a predefined set of characters, such as, for example, all of the numeric characters 0-9. In addition, a particular class of characters may be a set of symbols, a set of typographical symbols, a set of punctuation marks, a set of special characters, a set of foreign language alphabetic characters associated with a user preference or a geographic location of the client device, a set of accent marks associated with a foreign language, or any other set of predefined characters.

Then, the data processing system compares the one or more character key sets with displayed character keys on the virtual input keyboard of the data processing system (step 518). Subsequent to comparing the one or more character key sets with the displayed character keys on the virtual input keyboard in step 518, the data processing system selects character keys in the one or more character key sets that do not match the displayed character keys on the virtual input keyboard of the data processing system (step 520). Afterward, the data processing system determines a delta set of character keys based on the selected character keys in the one or more character key sets that did not match the displayed character keys on the virtual input keyboard (step 522).

Further, the data processing system generates a set of delta character supplemental virtual input keyboards based on the delta set of character keys (step 524). Then, the data processing system displays the set of delta character supplemental virtual input keyboards in the display (step 422). The data processing system may display the set of delta character supplemental virtual input keyboards, for example, in the display adjacent to the particular field selected within the form. Alternatively, the data processing system may display the set of delta character supplemental virtual input keyboards in an open or unused area within the data processing system's display.

Subsequently, the data processing system receives inputs from the set of delta character supplemental virtual input keyboards and the virtual input keyboard to insert characters corresponding to the inputs into the particular field selected within the form (step 528). Afterward, the data processing system makes a determination as to whether the data processing system received an input selecting another particular field within the form (step 530). If the data processing system determines that the data processing system did receive an input selecting another particular field within the form, yes output of step 530, then the data processing system removes the set of delta character supplemental virtual input keyboards from the display (step 532) and the process returns to step 508 thereafter. If the data processing system determines that the data processing system did not receive an input selecting another particular field within the form, no output of step 530, then the process terminates thereafter.

Figure 6B:
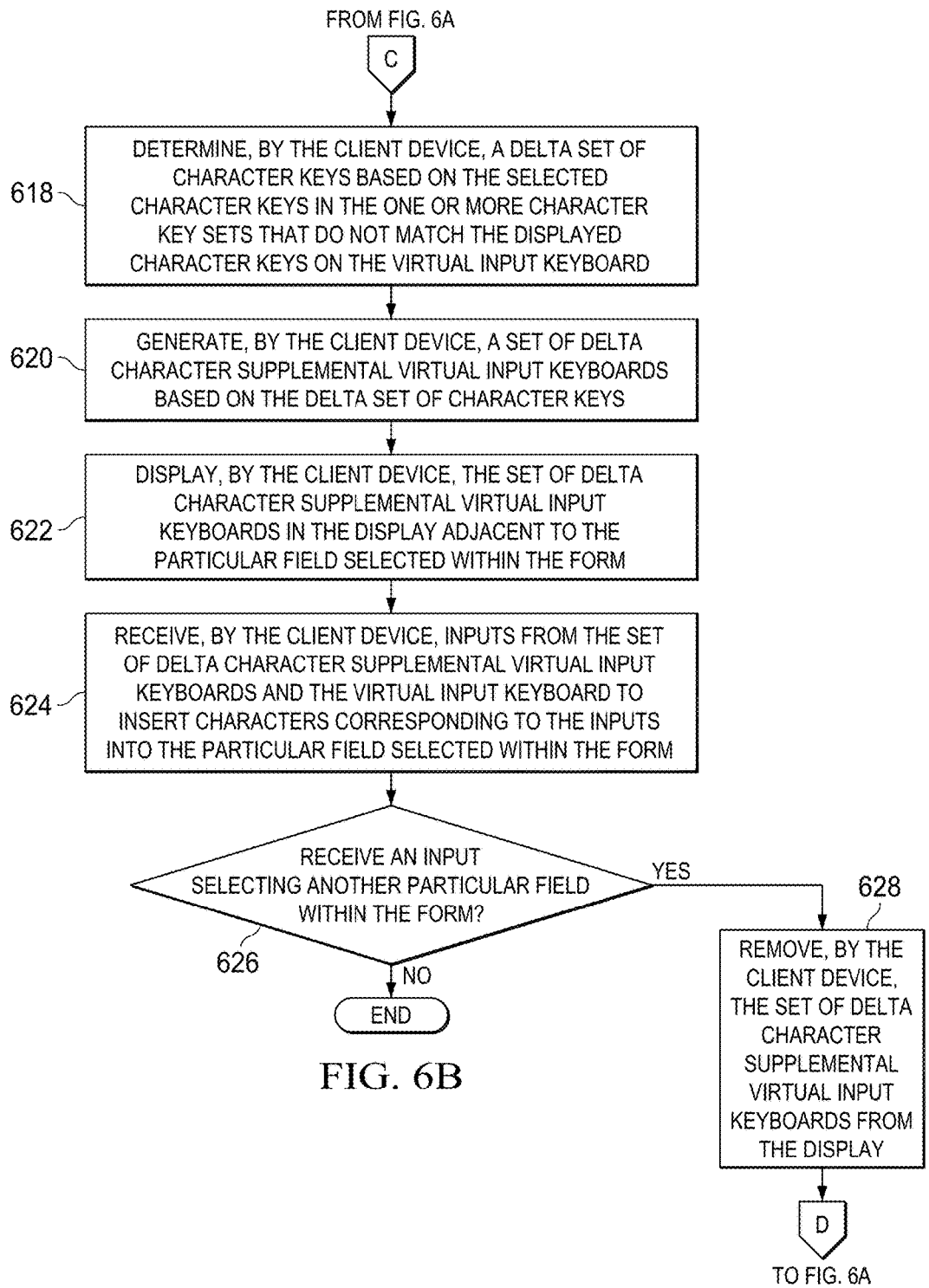

With reference now to FIG. 6A and FIG. 6B, a flowchart illustrating a process of a client device is shown in accordance with an illustrative embodiment. The process shown in FIGS. 6A and 6B may be implemented in a data processing system, such as, for example, data processing system 200 in FIG. 2 and performed by a client device, such as client device 302 in FIG. 3.

The process begins when the client device sends a request for a form to a server device via a network along with information about the client device and user preferences (step 602). The form may be, for example, a web form, such as web form 320 in FIG. 3. The server device may be, for example, server device 304 and FIG. 3. The information about the client device may include, for example, a type of the client device, an operating system of the client device, a type of web browser used by the client device, display parameters of the client device, virtual input keyboard layout of the client device, a geographic location of the client device, and any other pertinent information regarding the client device. The user preferences may include, for example, a preferred language of a user of the client device, a preferred set of character key sets, and the like.

Subsequently, the client device receives the form from the server device (step 604). Then, the client device displays the form received from the server device and a virtual input keyboard in a display of the client device (step 606). Afterward, the client device receives an input selecting a particular field within the form (step 608).

Subsequent to receiving the input selecting a particular field within the form in step 608, the client device sends metadata that identifies the particular field selected within the form to the server device (step 610). Then, the client device receives one or more character key sets from the server device corresponding to previous data entries of the particular field selected (step 612). Afterward, the client device compares the one or more character key sets received from the server device with displayed character keys on the virtual input keyboard of the client device (step 614).

Subsequent to comparing the one or more character key sets received from the server device with the displayed character keys on the virtual input keyboard of the client device in step 614, the client device selects character keys in the one or more character key sets received from the server device that do not match the displayed character keys on the virtual input keyboard of the client device (step 616). Then, the client device determines a delta set of character keys based on the selected character keys in the one or more character key sets that did not match the displayed character keys on the virtual input keyboard (step 618). Further, the client device generates a set of delta character supplemental virtual input keyboards based on the delta set of character keys (step 620).

Then, the client device displays the set of delta character supplemental virtual input keyboards in the display (step 622). Subsequently, the client device receives inputs from the set of delta character supplemental virtual input keyboards and the virtual input keyboard to insert characters corresponding to the inputs into the particular field selected within the form (step 624). Afterward, the client device makes a determination as to whether the client device received an input selecting another particular field within the form (step 626). If the client device determines that the client device did receive an input selecting another particular field within the form, yes output of step 626, then the client device removes the set of delta character supplemental virtual input keyboards from the display (step 628) and the process returns to step 610 thereafter. If the client device determines that the client device did not receive an input selecting another particular field within the form, no output of step 626, then the process terminates thereafter.

With reference now to FIG. 7, a flowchart illustrating a process of a server device is shown in accordance with an illustrative embodiment. The process shown in FIG. 7 may be implemented in a data processing system, such as, for example, data processing system 200 in FIG. 2 and performed by a server device, such as server device 304 in FIG. 3.

The process begins when the server device receives a request for a form from a client device via a network along with information about the client device and user preferences (step 702). The form may be, for example, a web form, such as web form 320 in FIG. 3. The client device may be, for example, client device 302 and FIG. 3.

After receiving the request in step 702, the server device sends the form to the client device (step 704). Subsequently, the server device receives metadata that identifies a particular field within the form from the client device (step 706). Then, the server device retrieves previous data entries of the particular field within the form from a database based on the metadata received from the client device identifying the particular field (step 708).

Afterward, the server device determines one or more character key sets that correspond to the previous data entries of the particular field based on the information about the client device and the user preferences received from the client device (step 710). Subsequently, the server device retrieves the one or more character key sets from the database that correspond to the previous data entries of the particular field based on the information about the client device and the user preferences received from the client device (step 712). Then, the server device sends the one or more character key sets to the client device that correspond to the previous data entries of the particular field based on the information about the client device and the user preferences (step 714).

Afterward, the server device makes a determination as to whether the server device received more metadata identifying another particular field within the form (step 716). If the server device did receive more metadata identifying another particular field within the form, yes output of step 716, then the process returns to step 708. If the server device did not receive more metadata identifying another particular field within the form, no output of step 716, then the process terminates thereafter.

Thus, illustrative embodiments of the present invention provide a computer implemented method, a data processing system, and a computer program product for automatically supplementing a virtual input keyboard displayed on a client device with a set of delta character supplemental virtual input keyboards that include character keys not present within the displayed virtual input keyboard, but are needed to input data into a particular input field of a web form. The process of automatically supplementing the virtual input keyboard with a set of delta character supplemental virtual input keyboards is repeated for each data input field within the web form when each particular field within the web form is selected for data entry. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, said method comprising:
   receiving, by a first computer device, a selection of a form field in a web page from a second computer device that is displaying a virtual keyboard with character keys displayed on a display screen in the second computer device, wherein the first and second computer devices are different computer devices;
   determining, by the first computer device, one or more candidate character keys based at least on previous data entries of the selected form field;
   removing, by the first computer- device, one or more matching character keys from the one or more candidate character keys that match the displayed character keys in the virtual keyboard;
   determining, by the first computer device, one or more supplement character keys of a supplemental keyboard based on character keys of the one or more candidate character keys that remain after the matching character keys have been removed from the one or more candidate character keys;
   communicating, by the first computer device, the one or more supplement character keys to the second computer device; and
   causing, by the first computer device, the second computer device to simultaneously display, on the display screen in the second computer device, the virtual keyboard and the supplemental keyboard adjacent to the form field without changing the virtual keyboard's layout and without substituting the keys in the virtual keyboard.

2. The method of claim 1, further comprising:
   responsive to the first computer device receiving a selection of another form field in the web page, causing, by the first computer device, the second computer device to remove only the supplemental keyboard from the display of the second computer device while still displaying the virtual keyboard on the display screen in the second computer device.

3. The method of claim 1, wherein determining one or more candidate character keys further comprises:
   receiving, by the first computer device, a first preferred language of the second computer device;
   receiving, by the first computer device, a second preferred language based on the previous data entries of the selected form field; and
   responsive to the receiving of the first preferred language and the second preferred language, selecting, by the first computer device, the first preferred language of the second computer device as language of the one or more candidate character keys.

4. The method of claim 1, further comprising:
   receiving, by the first computer device, all of the form fields available in the web page, wherein the second computer device is displaying the virtual keyboard on the display screen in the second computer device;
   repeating the steps of the determining the one or more candidate character keys, the removing the one or more matching keys, and the determining the one or more supplement character keys until the first computer device determines the one or more supplement character keys for all of the form fields available in the web page;
   communicating, by the first computer device, the one or more supplement character keys for all of the form fields available in the web page to the second computer device; and
   causing, by the first computer device, the second computer device to simultaneously display, on the display screen in the second computer device, the virtual keyboard and the supplemental keyboard adjacent to the form field for all of the form fields available in the web page without changing the layout of the virtual keyboard and without substituting the keys in the virtual keyboard.

5. The method of claim 4, further comprising:
   causing, by the first computer device, the second computer device to cache the one or more supplement character keys for all of the form fields available in the web page.

6. The method of claim 1, wherein said determining one or more candidate character keys is further based on an operating system of the second computer device.

7. The method of claim 1, wherein said determining one or more candidate character keys is further based on a type of web browser type used by the second computer device.

8. The method of claim 1, wherein said determining one or more candidate character keys is further based on a geographic location of the second computer device.

9. A computer program product, comprising one or more computer readable hardware storage devices having computer readable program code stored therein, said program code containing instructions executable by one or more processors of a computer system to implement a method, said method comprising:
   receiving, by a first computer device, a selection of a form field in a web page from a second computer device that is displaying a virtual keyboard with character keys displayed on a display screen in the second computer device, wherein the first and second computer devices are different computer devices;

determining, by the first computer device, one or more candidate character keys based at least on previous data entries of the selected form field;

removing, by the first computer device, one or more matching character keys from the one or more candidate character keys that match the displayed character keys in the virtual keyboard;

determining, by the first computer device, one or more supplement character keys of a supplemental keyboard based on character keys of the one or more candidate character keys that remain after the matching character keys have been removed from the one or more candidate character keys;

communicating, by the first computer device, the one or more supplement character keys to the second computer device; and causing, by the first computer device, the second computer device to simultaneously display, on the display screen in the second computer device, the virtual keyboard and the supplemental keyboard adjacent to the form field without changing the virtual keyboard's layout and without substituting the keys in the virtual keyboard.

10. The computer program product of claim 9, further comprising:

responsive to the first computer device receiving a selection of another form field in the web page, causing, by the first computer device, the second computer device to remove only the supplemental keyboard from the display of the second computer device while still displaying the virtual keyboard on the display screen in the second computer device.

11. The computer program product of claim 9, wherein determining one or more candidate character keys further comprises:

receiving, by the first computer device, a first preferred language of the second computer device;

receiving, by the first computer device, a second preferred language based on the previous data entries of the selected form field; and responsive to the receiving of the first preferred language and the second preferred language, selecting, by the first computer device, the first preferred language of the second computer device as language of the one or more candidate character keys.

12. The computer program product of claim 9, further comprising:

receiving, by the first computer device, all of the form fields available in the web page, wherein the second computer device is displaying the virtual keyboard on the display screen in the second computer device;

repeating the steps of the determining the one or more candidate character keys, the removing the one or more matching keys, and the determining the one or more supplement character keys until the first computer device determines the one or more supplement character keys for all of the form fields available in the web page;

communicating, by the first computer device, the one or more supplement character keys for all of the form fields available in the web page to the second computer device; and causing, by the first computer device, the second computer device to simultaneously display, on the display screen in the second computer device, the virtual keyboard and the supplemental keyboard adjacent to the form field for all of the form fields available in the web page without changing the layout of the virtual keyboard and without substituting the keys in the virtual keyboard.

13. The computer program product of claim 12, further comprising:

causing, by the first computer device, the second computer device to cache the one or more supplement character keys for all of the form fields available in the web page.

14. A computer system, comprising one or more processors, one or more memories, and one or more computer readable hardware storage devices, said one or more hardware storage device containing program code executable by the one or more processors via the one or more memories to implement a method, said method comprising:

receiving, by a first computer device, a selection of a form field in a web page from a second computer device that is displaying a virtual keyboard with character keys displayed on a display screen in the second computer device, wherein the first and second computer devices are different computer devices;

determining, by the first computer device, one or more candidate character keys based at least on previous data entries of the selected form field;

removing, by the first computer device, one or more matching character keys from the one or more candidate character keys that match the displayed character keys in the virtual keyboard;

determining, by the first computer device, one or more supplement character keys of a supplemental keyboard based on character keys of the one or more candidate character keys that remain after the matching character keys have been removed from the one or more candidate character keys;

communicating, by the first computer device, the one or more supplement character keys to the second computer device; and causing, by the first computer device, the second computer device to simultaneously display, on the display screen in the second computer device, the virtual keyboard and the supplemental keyboard adjacent to the form field without changing the virtual keyboard's layout and without substituting the keys in the virtual keyboard.

15. The computer system of claim 14, further comprising:

responsive to the first computer device receiving a selection of another form field in the web page, causing, by the first computer device, the second computer device to remove only the supplemental keyboard from the display of the second computer device while still displaying the virtual keyboard on the display screen in the second computer device.

16. The computer system of claim 14, wherein determining one or more candidate character keys further comprises:

receiving, by the first computer device, a first preferred language of the second computer device;

receiving, by the first computer device, a second preferred language based on the previous data entries of the selected form field; and responsive to the receiving of the first preferred language and the second preferred language, selecting, by the first computer device, the first preferred language of the second computer device as language of the one or more candidate character keys.

17. The computer system of claim 14, further comprising:

receiving, by the first computer device, all of the form fields available in the web page, wherein the second computer device is displaying the virtual keyboard on the display screen in the second computer device;

repeating the steps of the determining the one or more candidate character keys, the removing the one or more matching keys, and the determining the one or more supplement character keys until the first computer device determines the one or more supplement character keys for all of the form fields available in the web page;

communicating, by the first computer device, the one or more supplement character keys for all of the form fields available in the web page to the second computer device; and causing, by the first computer device, the second computer device to simultaneously display, on the display screen in the second computer device, the virtual keyboard and the supplemental keyboard adjacent to the form field for all of the form fields available in the web page without changing the layout of the virtual keyboard and without substituting the keys in the virtual keyboard.

18. The computer system of claim 17, further comprising:

causing, by the first computer device, the second computer device to cache the one or more supplement character keys for all of the form fields available in the web page.

* * * * *